United States Patent
Mahiddini et al.

(10) Patent No.: US 10,419,518 B2
(45) Date of Patent: Sep. 17, 2019

(54) CONTROL AND SUPERVISION OF CONNECTED OBJECTS

(71) Applicant: Alcatel Lucent, Boulogne Billancourt (FR)

(72) Inventors: Patrice Mahiddini, Nozay (FR); Dominique Rondeau, Nozay (FR)

(73) Assignee: Alcatel Lucent, Nozay (FR)

( * ) Notice: Subject to any disclaimer, the term of this patent is extended or adjusted under 35 U.S.C. 154(b) by 36 days.

(21) Appl. No.: 15/533,831

(22) PCT Filed: Oct. 30, 2015

(86) PCT No.: PCT/EP2015/075216
§ 371 (c)(1),
(2) Date: Jun. 7, 2017

(87) PCT Pub. No.: WO2016/091457
PCT Pub. Date: Jun. 16, 2016

(65) Prior Publication Data
US 2017/0331876 A1 Nov. 16, 2017

(30) Foreign Application Priority Data
Dec. 8, 2014 (EP) ..................................... 14306971

(51) Int. Cl.
*G06F 13/00* (2006.01)
*H04L 29/08* (2006.01)
(Continued)

(52) U.S. Cl.
CPC .......... *H04L 67/025* (2013.01); *H04L 51/043* (2013.01); *H04L 51/18* (2013.01);
(Continued)

(58) Field of Classification Search
CPC .. H04L 65/1016; H04L 67/025; H04L 51/043; H04L 51/18; H04L 65/1006;
(Continued)

(56) References Cited

U.S. PATENT DOCUMENTS 8,305,210 B2 * 11/2012 Bakker ............. H04M 1/72536
340/540
9,143,537 B2 * 9/2015 Mui ..................... H04L 65/1073
(Continued)

FOREIGN PATENT DOCUMENTS

CN     101277206 A     10/2008
CN     101523844 A     9/2009
(Continued)

OTHER PUBLICATIONS

Information Society Technologies, "WP2—System Concepts and Architecture Deliverable Report," pp. 1-115, XP002551488, Dec. 31, 2007.
(Continued)

*Primary Examiner* — Kenneth R Coulter
(74) *Attorney, Agent, or Firm* — Fay Sharpe LLP

(57) ABSTRACT

For a supervision and control of connected objects registered in an IMS network, an application server performs the following: receiving a first message containing an identifier of a connected object (CO) from a supervision server (SS), retrieving a SIP number of the CO associated with the identifier, sending a second message containing the identifier to a messaging server (MS) of the IMS network the second message further containing instructions interpreted by the MS to send a control message to an instant messaging client of the CO using the SIP number, the second message and the control message containing a command that is executed by the CO to trigger a monitoring of a sensor of the CO or the activation of a resource of the CO, receiving an update
(Continued)

message from the CO, the update message containing a value of a sensor of the CO or an acknowledgment of said activation.

17 Claims, 2 Drawing Sheets

(51) Int. Cl.
 *H04L 29/06* (2006.01)
 *H04L 12/58* (2006.01)
 *H04L 29/12* (2006.01)

(52) U.S. Cl.
 CPC ...... *H04L 61/2076* (2013.01); *H04L 65/1006* (2013.01); *H04L 65/1016* (2013.01); *H04L 67/12* (2013.01); *H04L 67/125* (2013.01); *H04L 61/256* (2013.01); *H04L 65/1063* (2013.01)

(58) Field of Classification Search
 CPC ... H04L 67/12; H04L 61/2076; H04L 67/125; H04L 65/1063; H04L 61/256
 USPC .............................. 709/224, 223, 245, 203
 See application file for complete search history.

(56) References Cited

U.S. PATENT DOCUMENTS

| | | | |
|---|---|---|---|
| 2006/0093119 A1 | 5/2006 | Wilson, Jr. et al. | |
| 2010/0136970 A1* | 6/2010 | Mui .................... | H04L 65/1073 455/435.1 |
| 2010/0189072 A1 | 7/2010 | Vikberg et al. | |
| 2011/0255446 A1* | 10/2011 | Potts ................. | H04M 3/42323 370/260 |
| 2016/0374117 A1* | 12/2016 | Bakker ............. | H04M 3/42348 |

FOREIGN PATENT DOCUMENTS

| JP | 2008519335 A | 6/2008 |
|---|---|---|
| JP | 2012023747 A | 2/2012 |

OTHER PUBLICATIONS

May El Barachi et al., "The Design and Implementation of Architectural Components for the Integration of the IP Multimedia Subsystem and Wireless Sensor Networks," IEEE Communications Magazine, vol. 48, No. 4, pp. 42-50, XP011306094, Apr. 2010.
International Search Report for PCT/EP2015/075216 dated Feb. 28, 2017.
English Bibliography of Japanese Patent Application Publication No. JP2008519335A, published Jun. 5, 2008, printed from Derwent Innovation on Nov. 20, 2018, 3 pp.
English Bibliography of Japanese Patent Application Publication No. JP2012023747A, published Feb. 2, 2012, printed from Derwent Innovation on Nov. 20, 2018, 4 pp.
European Patent Application No. 14306971.4-1853, Extended European Search Report, dated May 27, 2015, 3 pages.
PCT Patent Application No. PCT/EP2015/075216, Written Opinion of the International Searching Authority, dated Feb. 28, 2017, 6 pages.
English Bibliography for Chinese Patent Publication No. CN1012776206A, Published on Oct. 1, 2008, Printed from Derwent Innovation on Aug. 7, 2019, 4 pages.
English Bibliography for Chinese Patent Publication No. CN101523844A, Published on Sep. 2, 2009, Printed from Derwent Innovation on Aug. 7, 2019, 5 pages.

\* cited by examiner

CONTROL AND SUPERVISION OF CONNECTED OBJECTS

FIELD OF THE INVENTION

The present invention pertains to the control and supervision of connected objects.

BACKGROUND

With the exponential deployment of connected objects, control and monitoring systems are facing new challenges and new difficulties, in particular for mobile objects connected to Internet via a wireless connection of a network operator.

Such systems are facing two main problems:
  to monitor thousands of objects in real time without permanently polling them;
  to reach these objects when they are connected with a private IP address that need to use either a network address translator (NAT) gateway or a proxy server to connect to the Internet;
  to reach these objects by bypassing inbound firewall rules.

One existing system is based on a periodic "polling" of the remote target object and interrogates the target object to get values about its status. This system demands a lot of network resources and requires the target object to have a public IP address.

Another existing system is based on a real time telemetry broadcast from the target object to the monitoring system. A network channel must be dedicated to the target object to broadcast the information. This system is not applicable to a fleet of thousand of objects.

There is a need for a control and monitoring system which is not based on the polling or broadcast techniques and which can communicate in real time with any remote client.

SUMMARY

This summary is provided to introduce concepts related to the present inventive subject matter. This summary is not intended to identify essential features of the claimed subject matter nor is it intended for use in determining or limiting the scope of the claimed subject matter.

In accordance with one embodiment, a method is provided for a supervision and control of connected objects registered in an IP Multimedia Subsystem (IMS) network, comprising the following steps in an application server:
  receiving a first message containing an identifier of a connected object from a supervision server,
  retrieving a SIP number of the connected object associated with the identifier of the connected object,
  sending a second message containing the identifier of the connected object to a messaging server of the IMS network, the second message further containing instructions interpreted by the messaging server to send a control message to an instant messaging client of the connected object using the SIP number of the connected object, the second message and the control message containing a command that is executed by the connected object to trigger an action on at least one sensor of the connected object or the activation of a resource of the connected object,
  receiving an update message from the connected object, the update message containing at least one value of a sensor of the connected object or an acknowledgment of said activation of a resource.

Advantageously, the invention provides a real time control and monitoring system which is not based on the techniques of polling of the connected object or broadcast and which can communicate in real time with any remote client, even if behind a private IP address or a firewall which filters and drops all inbound traffic.

In an embodiment, the application server interrogates a presence server of the IMS network with the identifier of the connected object to retrieve the SIP number of the connected object, the presence server being able to find the SIP number of the connected object associated with the identifier of the connected object stored in a database.

In an embodiment, said action on at least one sensor of the connected object is a monitoring of said at least one sensor of the connected object.

In an embodiment, the application server forwards the update message to a presence server of the IMS network that stores said at least one value of a sensor of the connected object in correspondence with the identifier of the connected object in a database.

In an embodiment, the method further comprises:
  receiving an update request sent from the supervision server, the update request containing the identifier of the connected object,
  interrogating a presence server of the IMS network with the identifier of the connected object and retrieving at least one last updated value of a sensor of the connected object stored in a database,
  sending an update response to the supervision server, the update response containing the identifier of the connected object and said at least one last updated value of a sensor of the connected object.

In an embodiment, the method further comprises:
  receiving a third message containing an identifier of a connected object from a supervision server,
  retrieving a SIP number of the connected object associated with the identifier of the connected object,
  sending a fourth message containing the identifier of the connected object to the messaging server of the IMS network, the fourth message further containing instructions interpreted by the messaging server to send a termination message to the instant messaging client of the connected object using the SIP number of the connected object, the fourth message and the termination message containing a command that is executed by the connected object to stop the monitoring of said at least one sensor of the connected object.

In an embodiment, said action on at least one sensor of the connected object is a configuration control of said at least one sensor of the connected object to define a value for said at least one sensor of the connected object, and said at least one value of a sensor of the connected object contained in the update message is a confirmation of the defined value.

In an embodiment, the first message is received by a dedicated web service of the application server.

The invention also pertains to a server for a supervision and control of connected objects registered in an IMS network, comprising:
  means for receiving a first message containing an identifier of a connected object from a supervision server,
  means for retrieving a SIP number of the connected object associated with the identifier of the connected object,
  means for sending a second message containing the identifier of the connected object to a messaging server of the IMS network, the second message further containing instructions interpreted by the messaging server to send a control message to an instant messaging client of the connected object using the SIP number of the connected object, the second message and the control message containing a command that is executed by the connected object to trigger an action on at least one sensor or the activation of a resource of the connected object of the connected object, means for receiving an update message from the connected object, the update message containing at least one value of a sensor of the connected object or an acknowledgment of said activation of a resource.

The invention also pertains to computer program capable of being implemented within a server, said program comprising instructions which, when the program is executed within said server, carry out steps according to the method according to the invention.

BRIEF DESCRIPTION OF THE FIGURES

Some embodiments of the present invention are now described, by way of example only, and with reference to the accompanying drawings. The same reference number represents the same element or the same type of element on all drawings.

The same reference number represents the same element or the same type of element on all drawings.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
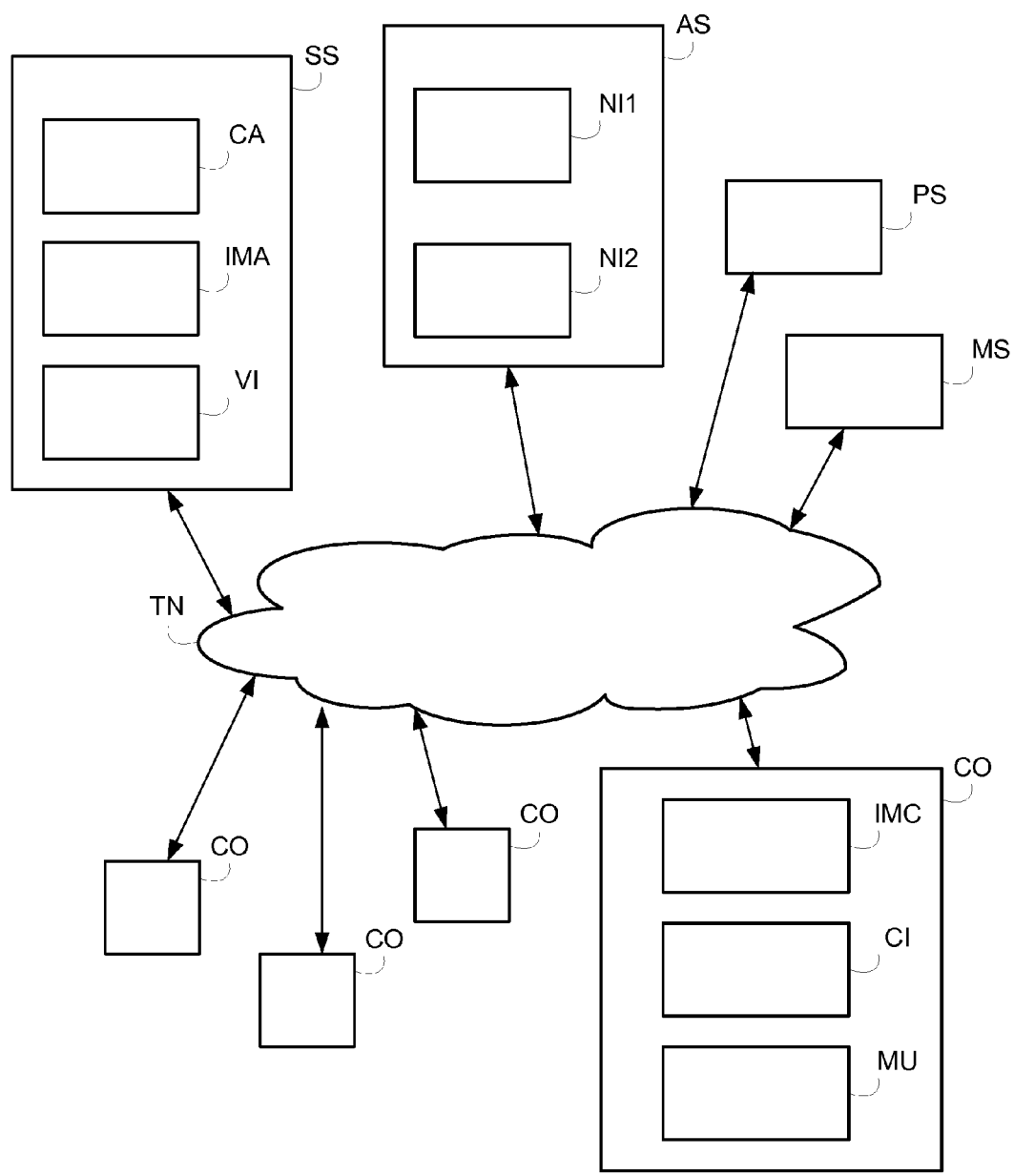
FIG. 1 is a schematic block diagram of a communication system according to one embodiment of the invention for a supervision of connected objects.

Referring to FIG. 1, a communication system comprises an application server AS, a supervision server SS, a presence server PS, a messaging server MS and a set of connected objects CO that are able to communicate with the servers through at least a telecommunication network TN.

The telecommunication network TN may be a wired or wireless network, or a combination of wired and wireless networks.

For example, the telecommunication network TN is a digital cellular radio communication network of the GSM (Global System for Mobile communications) or UMTS (Universal Mobile Telecommunications System) or even CDMA (Code Division Multiple Access) type or even LTE (Long Term Evolution) type. The GSM type network may be coupled with a GPRS (General Packet Radio Service) network for the transmission of data by packets with mobility and access management via radio.

Furthermore, the telecommunication network TN can be accessed via a wireless network, such as a WIFI network.

The telecommunication network TN can be associated with a packet network, for example, an IP ("Internet Protocol") high-speed network such as the Internet or an intranet, or even a company-specific private network.

According to one embodiment of the invention that will be referred to throughout the remainder of the description, the telecommunication network TN comprises a packet network, for example, an IP ("Internet Protocol") high-speed network such as the Internet or an intranet, or even a company-specific private network. An IP Multimedia Subsystem (IMS) network is deployed over the IP network. The IMS network makes use of the Session Initiation Protocol (SIP) to set up and control calls or sessions between communication devices, such as user terminals and application servers.

The control of a communication related to a connected object is performed within the IMS network, particularly by three Call State Control Function (CSCF) control entities: the entities Proxy CSCF (P-CSCF), Interrogating CSCF (I-CSCF), and Serving-CSCF (S-CSCF).

The entity P-CSCF is the first point of contact in the IMS network, and its address is discovered by the user terminal when a Packet Data Protocol (PDP) context is activated to exchange SIP messages.

A connected object CO comprises a network interface NI connected to the telecommunication network TN. The network interface is part of a data processing unit that may be directly embedded in the connected object CO. Alternatively, an interface device that forms a gateway may be arranged between a plurality of connected objects and the telecommunication network TN.

The connected objects CO may be of different nature. For instance, the connected objects CO may be devices such as an advertisement board, a television set, a household appliance, a communication terminal, a fridge, a camera, a media drive, an information display etc. The connected objects CO may be present in the user's home but also in public environments or other locations, for instance the user's workplace.

Moreover, each connected object CO may offer a plurality of services via its data processing unit having a network interface. A service is a function offered by a connected object which is available through the telecommunication network and therefore may be used or activated by using a communication terminal or server. For instance, a connected object such as a lamp provides a switch-on/switch-off service that permits a communication terminal to switch on or off the lamp remotely through the telecommunication network. Depending on the service, a connected object contains also at least one internal sensor that can be associated with different values or a resource that can be activated remotely.

On each connected object is deployed a presence client able to provide presence information to the presence server PS.

On each connected object is deployed an instant messaging client IMC able to receive and send messages, such as instant messages.

A connected object comprises also a command interpreter CI able to translate a received message into local commands.

A connected object comprises also a monitoring unit MU that is a data-sources grabber able to constantly monitor internal sensors values and to send these values to the application server AS. These values can be sent on request via a dedicated API.

Each connected object owns a unique identifier, like a serial number, and a unique SIP number.

The supervision server SS is an entity dedicated to the supervision and control of connected objects.

The supervision server SS implements a control agent CA that is an interface with the telecommunication network and interrogates the application server AS.

Optionally, the supervision server SS implements an instant messaging agent IMA and a value interpreter VI. The instant messaging agent IMA is permanently connected to the application server in order to receive sensors values in real time messages without having to poll a dedicated service of the application server.

The value interpreter VI is able to translate received sensors values in correctly formatted inputs for the supervision server.

The supervision server SS commands a supervision of a connected object by sending a command message destined to the connected object that triggers a monitoring of sensors.

The supervision server SS commands also a configuration of a connected object by sending a command message destined to the connected object that defines a given value for a sensor.

The supervision server SS commands also an activation of a resource of a connected object by means of a command message. These command messages are sent towards the connected object via the application server AS.

The presence server PS is included in the IMS network and manages a database storing information about connectivity of communication devices, for example presence information of connected object.

This database can be linked to a centralized directory XDMS (XML Database Management Server).

The presence server PS is part of a Rich Communication Suite (RCS) that uses the capabilities of IMS core system as the underlying service platform taking care of issues such as authentication, authorization, registration, charging and routing.

In one variant, the presence server and the centralized directory XDMS are implemented in different network servers included in the IMS network.

The messaging server MS implements a real time instant messaging system able to communicate with the instant messaging clients of the connected objects, and optionally with the instant messaging client of the supervision server.

The application server AS is an API (Application Programming Interface) gateway, and may use open standard applications such as HTTP (Hypertext Transfer Protocol), SOAP (Simple Object Access Protocol), JSON (JavaScript Object Notation), XML (Extensible Markup Language), and REST (Representational state transfer), . . . .

In another embodiment, the application server AS acts as or may take advantage of an API gateway connected to application server AS to access IMS network services.

An Application Programming Interface (API) is a specification that defines an interface for software components to communicate with each other. An API may include specifications for functions, data structures, object classes, and variables. Some examples of API specifications include the standard template library in $C_{++}$, the Microsoft Windows API, libraries in C, and the Java API. When an API specifies a function, the API provides information about how the function is called, what parameters are included in calling the function, and the format and type of data returned by the function.

For example, the application server AS identifies and deploys code objects to implement web services.

The application server AS comprises a first network interface NI1 and a second network interface NI2.

The first network interface NI1 comprises a first set of application programming interfaces to communicate with applications developed and used by the set of connected objects CO and the supervision server SS.

The second network interface NI2 comprises a second set of application programming interfaces to communicate with applications on the side of the IMS network, especially with the presence server PS and the messaging server MS.

For example, the first network interface NI1 implements web services that are exposed REST web services.

In one embodiment, both first network interface NI1 and second network interface NI2 implement two web services.

A first web service, called "SETDATASOURCEVALUE" service, receives sensors values from the connected objects via the first network interface and stores the sensors values in the database of the presence server.

A second web service, called "GETDATASOURCEVALUE" service, gives access to the sensors values stored in the database to the supervision server SS.

A connected object registers on the IMS network via the telecommunication network. It can use its own network interface NI to obtain an IP address or can be located behind a gateway having a public or private IP address. The connected object keeps an open session with the IMS network, the presence server PS having stored an identifier of the connected object in correspondence with a SIP number attributed to the connected object. Even if the connected object is located behind a private IP address, the connected object is still accessible via its SIP number.

Figure 2:
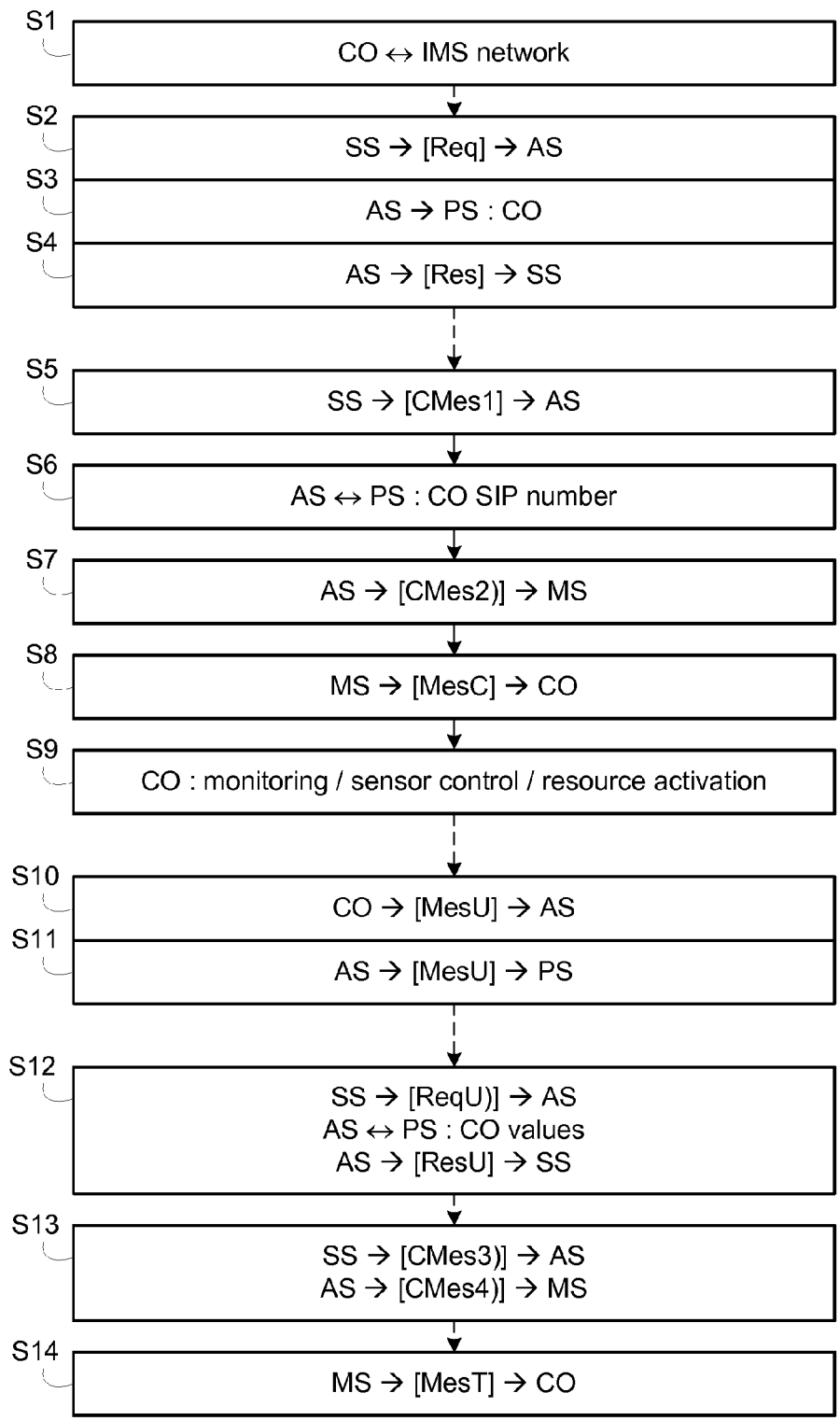
FIG. 2 is a flow chart illustrating a method for a supervision of connected objects according to one embodiment of the invention.

With reference to FIG. 2, a method for a supervision of connected objects according to one embodiment of the invention comprises steps S1 to S13 executed within the communication system.

In step S1, a set of connected objects CO registers on the IMS network, each connected object obtaining a SIP number.

For each connected object, the presence server PS stores an identifier of the connected object in correspondence with a SIP number attributed to the connected object.

In step S2, the supervision server SS interrogates the application server AS about a connected object in order to obtain information on the operating status of the connected object.

For that, the supervision server sends a request Req to the application server AS, the request containing an identifier of the connected object CO.

In step S3, the application server AS interrogates the presence server by means of the identifier of the connected object CO. The presence server looks into the database to find, if any, the SIP number attributed to the connected object that is associated with the identifier of the connected object. The presence server returns presence information of the connected object to the application server.

In step S4, the application server AS sends a response Res to the supervision server SS, the response containing the identifier of the connected object CO and the presence information of the connected object.

It means that the connected object CO is active and can be remotely monitored.

In step S5, the supervision server SS sends a first command message CMes1 to the application server AS in order to start the monitoring of the connected object.

The first command message CMes1 is a HTTP request and contains the identifier of the connected object and instructions to be interpreted by the application server AS to produce a second command message CMes2.

In step S6, the application server AS retrieves a SIP number of the connected object CO associated with the identifier of the connected object. To that end, the application server AS interrogates the presence server PS with the identifier of the connected object, the presence server being able to find the SIP number of the connected object associated with the identifier of the connected object stored in the database.

In step S7, the application server AS produces and sends the second command message CMes2 to the messaging server MS. The second command message CMes2 contains the SIP number of the connected object and instructions to be interpreted by the messaging server MS to produce a control message MesC.

The second command message CMes2 contains a command destined to the connected object. The command can be an initialization command such as "START SENDING DATA" or a control command such as "DEFINE SENSOR X WITH VALUE Y" or "ACTIVATE RESOURCE Z".

In step S8, the messaging server MS produces the control message MesC as an instant message and converts the content of the second command message CMes2 into a format compatible with the instant message format.

The messaging server MS sends the control message MesC towards the instant messaging client of the connected object CO, using the SIP number of the connected object.

The control message MesC contains the command, of initialization command type like "START SENDING DATA" or of control command type like "DEFINE SENSOR X WITH VALUE Y" or "ACTIVATE RESOURCE Z", that is interpreted and executed by the command interpreter of the connected object in order to trigger an action on at least one sensor or resource of the connected object.

In step S9, if the control message MesC contains the initialization command, the triggered action is the starting of a monitoring of sensors of the connected object and the monitoring unit MU of the connected object CO starts a monitoring of the sensors of the connected object in order to get updated values of the sensors.

For example, the connected object is a car having sensors for tire pressure and the engine temperature. Every minute, the monitoring unit MU can get the last value of the sensors.

If the control message MesC contains the control command, the triggered action is a configuration control of sensors of the connected object or an activation of a resource of the connected object.

For the configuration control of sensors, the monitoring unit MU of the connected object CO defines a value for at least one sensor according to the control command contained in the control message. For instance for a connected car, a value for a sensor could be defined for the maximal temperature of an engine, or set for a rotation speed of a fan or for the volume of an alarm.

For an activation of a resource of the connected object, the monitoring unit MU of the connected object CO activates the resource identified in the control command contained in the control message. For instance for a connected car, such control command could be "START ENGINE" or "OPEN LEFT FRONT DOOR".

In step S10, the monitoring unit MU of the connected object CO sends an update message MesU to the application server AS, the update message MesU containing the identifier of the connected object and at least one updated value of a sensor or an acknowledgment of the activation of the resource. The updated message is sent towards the dedicated web service of the first network interface NI1, called "SETDATASOURCEVALUE" service.

If the control message MesC contains the control command, the update message MesU contains said at least one updated value of a sensor that is a confirmation of the value defined for the sensor or an acknowledgment of the activation of the resource. Said acknowledgment could be provided by the resource under the form of a code.

If the control message MesC contains the control command, the method stops at step S10.

If the control message MesC contains the initialization command, the method continues with step S11 to step S14.

In step S11, the application server AS forwards the update message MesU via the second interface NI2 to the presence server PS that stores the updated values in correspondence with the identifier of the connected object in the database.

The application server AS permits to the supervision server SS to access the sensors values via the second web service, called "GETDATASOURCEVALUE" service.

In step S12, the supervision server SS polls the application server via the "GETDATASOURCEVALUE" service. To that end, the supervision server sends an update request ReqU to the application server, the update request ReqU containing the identifier of the connected object. The application server interrogates the presence server PS with the identifier of the connected object and retrieves the last updated values stored in the database. The application server sends an update response ResU to the supervision server SS, the update response ResU containing the identifier of the connected object and the retrieved updated values.

The application server converts messages received from the presence server PS into format readable by the supervision server SS.

The polling can be done between the supervision server and the application server located on the same network part or behind an accessible IP address.

In one variant for step S12, the supervision server SS implements an instant messaging agent IMA that is able to receive data in real time from the messaging server, avoiding thus the polling operation.

To that end, the instant messaging agent IMA registers in the presence server by means of an identifier of the instant messaging agent IMA and the identifier of the connected object in order to receive data related to the connected object. Thus the instant messaging agent IMA subscribes to a service of receiving last updated values stored by the presence server PS. The instant messaging agent IMA can subscribe for several or all the connected objects it is aware of Each time an updated value or a set of updated values is stored in the database by the presence server, the updated value or set of updated values is retrieved by the messaging server MS that sends an instant message containing the updated value or set of updated values to the supervision server SS.

The value interpreter VI of the supervision server translates the content of the received instant message in correctly formatted inputs for the supervision server.

In step S13, the supervision server terminates the monitoring of the connected object.

To that end, the supervision server SS sends a third command message CMes3 to the application server AS in order to stop the monitoring of the connected object. The third command message CMes3 is a HTTP request and contains the identifier of the connected object instructions interpreted by the application server AS to produce a fourth command message CMes4. The application server AS retrieves the SIP number of the connected object associated with the identifier of the connected object via the presence server, as in step S6.

Then, the application server AS sends the fourth command message CMes4 to the messaging server MS. The fourth command message CMes4 contains instructions interpreted by the messaging server MS to produce a termination message MesT.

In step S14, the messaging server MS sends the termination message MesT towards the instant messaging client of the connected object.

The termination message MesT contains a command, such as "STOP SENDING DATA", that is interpreted and executed by the command interpreter of the connected object.

The monitoring unit MU of the connected object stops the monitoring of the sensors of the connected object and does not send message to the application server anymore.

The invention described here relates to a method and a server for a supervision and control of connected objects. According to one implementation of the invention, steps of the invention are determined by the instructions of a computer program incorporated into a server, such as the application server. The program comprises program instructions which, when said program is loaded and executed within the server, carry out the steps of the method.

Consequently, the invention also applies to a computer program, particularly a computer program on or within an information medium, suitable to implement the invention. This program may use any programming language, and be in the form of source code, object code, or intermediate code between source code and object code, such as in a partially compiled form, or in any other form desirable for implementing the method according to the invention.

The invention claimed is:

1. A method for supervision and control of connected objects registered in an IP Multimedia Subsystem (IMS) network, said method comprising:
receiving a first message containing an identifier of a connected object from a supervision server at an application server,
retrieving a SIP number of the connected object associated with the identifier of the connected object,
sending a second message containing the identifier of the connected object from the application server to a messaging server of the IMS network, the second message further containing instructions interpreted by the messaging server to send a control message to an instant messaging client of the connected object using the SIP number of the connected object, the second message and the control message containing a command that is executed by the connected object to trigger an action on at least one sensor of the connected object or activation of a resource of the connected object, and
receiving an update message from the connected object at the application server, the update message containing at least one value of a sensor of the connected object or an acknowledgment of said activation of said resource of the connected object.

2. A method according to claim 1, wherein the application server interrogates a presence server of the IMS network with the identifier of the connected object to retrieve the SIP number of the connected object, the presence server being able to find the SIP number of the connected object associated with the identifier of the connected object stored in a database.

3. A method according to claim 1, wherein said action on said at least one sensor of the connected object is a monitoring of said at least one sensor of the connected object.

4. A method according to claim 3, wherein the application server forwards the update message (MesU) to a presence server of the IMS network that stores said at least one value of said sensor of the connected object in correspondence with the identifier of the connected object in a database.

5. A method according to claim 3, further comprising:
receiving an update request sent from the supervision server, the update request containing the identifier of the connected object,
interrogating a presence server of the IMS network with the identifier of the connected object to retrieve at least one last updated value of a sensor of the connected object stored in a database, and
sending an update response to the supervision server, the update response containing the identifier of the connected object and said at least one last updated value of the sensor of the connected object.

6. A method according to claim 3, further comprising:
receiving a third message containing an identifier of a connected object from the supervision server,
retrieving a SIP number of the connected object associated with the identifier of the connected object, and
sending a fourth message containing the identifier of the connected object to the messaging server of the IMS network, the fourth message further containing instructions interpreted by the messaging server to send a termination message to the instant messaging client of the connected object using the SIP number of the connected object, the fourth message and the termination message containing a command that is executed by the connected object to stop the monitoring of said at least one sensor of the connected object.

7. A method according to claim 1, wherein said action on said at least one sensor of the connected object is a configuration control of said at least one sensor of the connected object to define a value for said at least one sensor of the connected object, and said at least one value of the sensor of the connected object contained in the update message is a confirmation of the defined value.

8. A method according to claim 1, wherein the first message is received by a dedicated web service of the application server.

9. An application server for supervision and control of connected objects registered in an IMS network, said application server comprising:
a first network interface configured to receive a first message containing an identifier of a connected object from a supervision server,
at least one processor and associated memory configured to retrieve a SIP number of the connected object associated with the identifier of the connected object, and
a second network interface configured to communicate with a messaging server of the IMS network,
wherein the at least one processor and associated memory are configured to send a second message containing the identifier of the connected object to the messaging server via the second network interface, the second message further containing instructions interpreted by the messaging server to send a control message to an instant messaging client of the connected object using the SIP number of the connected object, the second message and the control message containing a command that is executed by the connected object to trigger an action on at least one sensor or activation of a resource of the connected object,
wherein the first network interface is configured to receive an update message from the connected object, the update message containing at least one value of a sensor of the connected object or an acknowledgment of said activation of said resource of the connected object.

10. The application server according to claim 9, wherein said at least one processor and associated memory are configured to interrogate a presence server of the IMS network via second network interface with the identifier of the connected object to retrieve the SIP number of the connected object, the presence server being able to find the SIP number of the connected object associated with the identifier of the connected object stored in a database.

11. The application server according to claim 9, wherein said action on said at least one sensor of the connected object is a monitoring of said at least one sensor of the connected object.

12. The application server according to claim 11, wherein said at least one processor and associated memory are configured to forward the update message (MesU) to a presence server of the IMS network via the second network interface for storing said at least one value of said sensor of the connected object in correspondence with the identifier of the connected object in a database.

13. The application server according to claim 11, wherein the first network interface is configured to receive an update request sent from the supervision server, the update request containing the identifier of the connected object,
- wherein said at least one processor and associated memory are configured to interrogate a presence server of the IMS network via the second network interface with the identifier of the connected object to retrieve at least one last updated value of a sensor of the connected object stored in a database,
- wherein said at least one processor and associated memory are configured to send an update response to the supervision server via the first network interface, the update response containing the identifier of the connected object and said at least one last updated value of the sensor of the connected object.

14. The application server according to claim 11, wherein the first network interface is configured to receive a third message containing an identifier of a connected object from the supervision server,
- wherein said at least one processor and associated memory are configured to retrieve a SIP number of the connected object associated with the identifier of the connected object,
- wherein said at least one processor and associated memory are configured to send a fourth message containing the identifier of the connected object to the messaging server of the IMS network via the second network interface, the fourth message further containing instructions interpreted by the messaging server to send a termination message to the instant messaging client of the connected object using the SIP number of the connected object, the fourth message and the termination message containing a command that is executed by the connected object to stop the monitoring of said at least one sensor of the connected object.

15. The application server according to claim 9, wherein said action on said at least one sensor of the connected object is a configuration control of said at least one sensor of the connected object to define a value for said at least one sensor of the connected object, and said at least one value of the sensor of the connected object contained in the update message is a confirmation of the defined value.

16. The application server according to claim 9, the application server includes a dedicated web service configured to receive the first message via the first network interface.

17. A non-transitory computer-readable medium storing program instructions that, when executed by a processor, cause an application server to perform a method for a supervision and control of connected objects registered in an IMS network, said method comprising:
- receiving a first message containing an identifier of a connected object from a supervision server,
- retrieving a SIP number of the connected object associated with the identifier of the connected object,
- sending a second message containing the identifier of the connected object to a messaging server of the IMS network the second message further containing instructions interpreted by the messaging server to send a control message to an instant messaging client of the connected object using the SIP number of the connected object, the second message and the control message containing a command that is executed by the connected object to trigger an action on at least one sensor or activation of a resource of the connected object, and
- receiving an update message from the connected object, the update message containing at least one value of a sensor of the connected object or an acknowledgment of said activation of said resource of the connected object.

* * * * *